United States Patent [19]
Sala et al.

[11] 3,892,428
[45] July 1, 1975

[54] SELF-REGENERATIVE CARBOGRAPHIC ARTICLES COMPRISING A LAYER INTERPOSED BETWEEN THE SUPPORT AND THE INK-RELEASING COATING

[76] Inventors: Sergio Sala, Via Pinamonte da Vimercate, 6; Cuneo Ambrogio, Via Durini 7, both of, Milan, Italy

[22] Filed: Apr. 12, 1971

[21] Appl. No.: 133,399

[30] Foreign Application Priority Data
Apr. 13, 1970  Italy.................................. 23224/70

[52] U.S. Cl............. 282/28 R; 117/167; 260/23 R; 260/23 AR; 260/23 XA; 428/306
[51] Int. Cl. .............................................. B41c 1/06
[58] Field of Search ..................................... 117/36.4

[56] References Cited
UNITED STATES PATENTS
| | | | |
|---|---|---|---|
| 2,943,952 | 7/1960 | Clark................................ | 117/36.4 |
| 3,520,713 | 7/1970 | Sala et al. ......................... | 117/36.4 |
| 3,531,312 | 9/1970 | Newman............................ | 117/36.4 |

*Primary Examiner*—Michael R. Lusignan
*Attorney, Agent, or Firm*—Toren and McGeady

[57] ABSTRACT

Self-regenerative carbographic articles comprising a layer interposed between the support and the ink-releasing coating, consisting essentially of sperm oil and of at least a film-forming polymer suitable to adhere both to the support and to the inked coating.

The novel articles show an improvement in longevity as well as in the intensity and neatness of the writing.

7 Claims, No Drawings

SELF-REGENERATIVE CARBOGRAPHIC ARTICLES COMPRISING A LAYER INTERPOSED BETWEEN THE SUPPORT AND THE INK-RELEASING COATING

The present invention relates to self-regenerative carbographic articles such as carbon paper, typewriter ribbons and similar articles which comprise, interposed between the support and the inked layer, an intermediate layer of a novel composition principally performing the functions of improving the anchorage of the inked coating to the support, of increasing the yield of the carbographic articles and of improving the characteristics of the writing.

In recent years, self-regenerative carbographic articles have undergone extensive development. These articles consist essentially of a support and an image-transferring coating comprising at least one polymer with cellular structure, anchored to the support, which is substantially non-transferable, and which under the pressure exerted by a suitable means squeezes out a certain amount of ink.

After the normal or mechanical pressure has been discontinued, ink from the neighbouring cells passes into the exhausted ones by capillarity and/or osmosis.

In any case an article producing highly uniform writing at any point of its surface up to complete exhaustion of the ink is obtained.

It is clear however that, in order for the above properties to be obtained, it is essential that the cellular polymer impregnated with ink does not detach from the support when the article is put under pressure. If this should occur, the vehicle for self-regeneration would be lost.

It has been already proposed to interpose between the support and the writing coating such self-regenerative carbographic articles, a homogeneous, continuous film of a polymeric material, preferably of the same polymer used to form the spongy layer, with the purpose of enhancing adhesion. In such cases, it was an essential condition that the film did not contain volatile components, incompatible with the polymer, since it is a known fact that components of this kind greatly reduce the adhesive power of the interposed polymeric layer thus causing the detachment of the inked coating from the support well in advance of ink exhaustion.

However interposed layers as above described are stiff and thus cause dilation of the types and formation of a writing which consequently lack neatness and sharpness.

We have now surprisingly found a substance which is non volatile and incompatible with the film-forming polymers, which can be interposed between the support and the inked coating of a self-regenerative carbographic article may be prepared and which possesses an adhesive power equal to or higher than that shown by the polymer alone. Additionally, the present invention improves the yield of the article and positively affects the writing characteristics by enhancing the intensity and neatness. The substance which we found possesses these properties and is a liquid wax and more precisely is sperm oil. It is thus an object of the present invention to provide new carbographic articles with improved yield and writing properties, characterized in that they comprise, interposed between the support and the writing coating, a continuous, homogeneous layer essentially consisting of sperm oil and of a film-forming polymer having a good adhesivity both with the material of the support and with the cellular polymer of the writing layer. The amount of sperm oil present in the interposed layer may vary within wide limits and may be at the most as high as 50% by weight on the weight of the polymer. Preferably such percentage is comprised between 30 and 50%.

The interposed layer according to the invention may be transparent, black or coloured.

As a matter of fact it has been found that the film-forming composition according to the invention, essentially consisting of the polymer and of sperm oil, is compatible with black and coloured pigments, if employed in given, critical proportions, without losing its advantageous properties. The coloured pigments must be employed in percentages comprised between 50 and 120% in respect to the total of the remaining components present in the composition, while the black components must be employed in percentages comprised between 2 and 10% in respect to the total amount of the remaining components present in the composition.

In preparing coloured inter-layer it is generally convenient to add small percentages of suitable plasticizers, preferably in an amount comprised between 5 and 10% of the entire composition.

Moreover, in the inter-layers containing coloured pigments, high percentages of sperm oil are constantly used and more precisely in percentages comprised between 40 and 50% based on the used polymer. In any case the interposed layer is from 3 to 5 $g/m^2$ thick.

As initially stated, the polymer used in the composition according to the invention can be any film-forming polymer or mixture of polymers, independently from the fact that it is the same or a different polymer from that used in the inked layer, provided that it is a polymer or a mixture of polymers showing adhesivity with respect to the support and to the inked layer.

Particularly good results have been obtained using polyvinylidene chloride, polyvinyl chloride, chlorinated rubber, acrylic polymers. As the colouring pigment, any pigment generally used to dye synthetic films can be used. Of course, it will be necessary to modify, within the stated limits, the composition of the film-forming mixture, depending on the pigment used and on the percentage of such pigment needed to obtain the colour intensity and the hiding power desired. The plasticizers suitable for the present invention are the same commonly used with the plastic materials, and more specifically include tricresyl phosphate, triphenyl phosphate, glyceryl-monooleates, glyceryl-monostearates, glyceryl-monopalmitates and the like.

These plasticizers are used in a percentage comprised between 2 and 25% based on the weight of the polymer.

The inter-layer according to the present invention are particularly suitable when applied to supports consisting of sheets, ribbons and the like of synthetic polymers, for example, films of polyester, nylon or polypropylene. However it is possible to use them equally well on common paper or silk supports.

The inked coating preferably used in the carbographic articles according to the invention essentially consists of: a simple or mixed cellulose ester, selected from the group comprising cellulose butyrate, propionate, proprionate-acetate, butyrate-acetate, propionate-butyrateacetate; sperm oil as the vehicle for pigments and/or dyes; mineral and/or vegetable and/or animal oil as plasticizers.

The plasticizer is generally used in the proportion of 0.5 to 2.5 parts by weight for each part of cellulose ester/s, while the vehicle amounts to 10–60% reckoned on the total plasticizer plus vehicle. In order to demonstrate the technical progress realized with the new invention and the unpredictable features of the same, the hereinafter reported comparative tests have been performed:

a. A solution showing the following composition has been applied on a polyethylenterephthalate film, of the type commonly used as support for carbon paper:

|  | Parts by Weight |
|---|---|
| alloprene (registered trade mark of ICI for chlorinated rubber) | 20 |
| sperm oil | 6 |
| toluene | 74 |

After solvent evaporation, a 3 g/m² thick, homogeneous, transparent layer remained on the polyester film.

On another sample of the same film, a solution having the following composition was applied:

|  | Parts by Weight |
|---|---|
| alloprene | 20 |
| mineral oil for inks (density 2.8° Engler) | 6 |
| toluene | 74 | in such a manner as to leave after solvent evaporation a homogeneous film having a thickness of 3 g/m². In order to evaluate the adhesion of the above described film to the polyester support, they have been submitted to the stripping standard tests with an adhesive ribbon. The result was that while the sperm oil containing film remained quite unaltered, the mineral oil containing film was completely stripped of.

b. The identical comparative test described under preceding item (a) was repeated by using this time compositions containing as the polymer polyvinylidene chloride. The obtained results were identical, that is the mineral oil containing layer did not resist to the stripping test, while that containing sperm oil showed a perfect adhesion to the support.

c. On a polypropylene tape of the type commonly used as support for typewriter ribbons, the hereinafter given compositions have been separately applied in such a manner as to obtain after solvent evaporation a layer of thickness 3 g/m²:

|  |  | Parts by Weight |
|---|---|---|
| 1) | polyvinylidene chloride | 10 |
|  | acetone | 90 |
| 2) | polyvinylidene chloride | 10 |
|  | mineral oil (2.8% Engler) | 3 |
|  | acetone | 87 |
| 3) | polyvinylidene chloride | 10 |
|  | sperm oil | 3 |
|  | acetone | 87 |

On the above layers, an inked coating has been applied having the following composition:

|  | Parts by Weight |
|---|---|
| cellulose acetate-butyrate 17½ | 150 |
| sperm oil | 30 |
| blown colza oil | 30 |
| ricinoleic acid | 30 |
| oleic acid | 5 |
| reflex blues | 45 |
| alkaline blues |  |
| carbon black | 30 |
| methyl ethyl ketone | 400 |

The prepared samples gave the hereinafter summarized results: the samples comprising the inter-layer (1) show a good adhesion and thus an increased longevity, a normal intensity in writing, that is, comparable to that obtained in the absence of such an interposed layer, but the type had enlarged and soft edges; the samples with inter-layer (2) show a bad adhesion and, as a consequence, a reduced life of the ribbon, although the intensity of the writing is better; the samples with inter-layer (3) show a very good adhesion and thus a longevity superior to that of the usual ribbons which do not comprise an inter-layer and slightly superior to that of sample (1), as well as a neatness and intensity of writing clearly superior to those obtained with usual ribbons and with the samples (1) and (2).

d. The hereinafter indicated compositions have been applied separately on a polyethylenterephthalate tape, in such a manner as to have, after solvent evaporation, a film of 3 g/m² thickness.

|  |  | Parts by Weight |
|---|---|---|
| 1) | acrylic polymer (Crilat L/14 18 Montedison) | 10 |
|  | ethyl acetate | 90 |
| 2) | acrylic polymer | 10 |
|  | mineral oil | 3 |
|  | ethyl acetate | 87 |
| 3) | acrylic polymer | 10 |
|  | sperm oil | 3 |
|  | ethyl acetate | 87 |

On the above indicated inter-layers, an inked coating has been applied, having the same composition indicated under test (c). The results obtained with the so prepared samples are quite comparable with those obtained in test (c), but with adhesion characteristics even superior in respect to inter-layer (3).

The results obtained with the novel inter-layer according to the invention are quite surprising both in view of the teaching of the prior art which explicitely excluded the possibility of using non-volatile substances, uncompatible in mixture with the polymer, and in view of the quite negative results obtained by us in the tests with mineral oils which are within the definition of non-volatile, uncompatible substances.

Moreover it is impossible to explain the improvement in the intensity and neatness of writing achieved with the use of sperm oil. As already said, the novel inter-layers according to the invention can be prepared with black or coloured pigments, so that as to achieve any desired aesthetical result. Compositions suitable to obtain pigmented inter-layers are hereinafter reported by way of illustrative example.

Composition for the preparation of a black inter-layer which, when used with a perfectly transparent support film, leads to a carbon paper with a quite uniform black back:

|  | Parts by Weight |
|---|---|
| black paste | 10 |

-Continued

| | |
|---|---|
| sperm oil | 40 |
| polyvinylidene chloride | 100 |
| methylethyl ketone | 500 |

The black paste has the following composition:

| | Parts by Weight |
|---|---|
| glyceryl monooleate | 23 |
| sperm oil | 9 |
| bleu H-768 Cowan | 12 |
| Peerles 155 Carbon black | 11 |

Composition for preparing a coloured inter-layer which, being the when used with a perfectly transparent support film, leads to a carbon paper with a back uniformly coloured, in any desired colour:

| | Parts by weight |
|---|---|
| colouring pigment | 35 |
| sperm oil | 10 |
| polyvinylidene chloride | 20 |
| plasticizer | 5 |
| methyl ethyl ketone | 170 |

We claim:

1. Self-regenerative carbographic articles comprising a support and an inked cellular coating having improved characteristics of longevity and reproduction and interposed between said support and inked coating, a homogeneous layer consisting essentially of sperm oil and a film-forming polymer suitable to adhere both to the support and to the inked coating and selected from the group consisting of polyvinylidene chloride, chlorinated rubber, and acrylic polymers, the amount of sperm oil being from about 30 to 50% based on the weight of the polymer.

2. Self-regenerative carbographic articles according to claim 1, characterized in that the homogeneous layer interposed between the support and the inked coating comprises also black or coloured pigments.

3. Self-regenerative carbographic articles according to claim 1, characterized in that the homogeneous layer interposed between the support and the inked coating comprises also plasticizers in an amount from about 2 to 25% based on the weight of the polymer.

4. Self-regenerative carbographic articles according to claim 3, characterized in that the plasticizers are selected in the group consisting of tricresyl phosphate, triphenyl phosphate, glyceryl monooleate, glyceryl monostearate, and glyceryl monopalmitate.

5. Self-regenerative carbographic articles of claim 1 characterized in that the layer interposed between the support and the inked coating has a thickness comprised between 3 and 5 g/m$^2$.

6. Transparent composition suitable to improve the adhesion between the support and the inked coating as well as the reproduction characteristics of self-regenerative carbographic articles, characterized in that it essentially comprises a film-forming polymer selected from the group consisting of polyvinylidene chloride, chlorinated rubber and acrylic polymers and from about 30 to 50% by weight sperm oil based on the weight of the film-forming polymer.

7. Coloured composition suitable to improve the adhesion between the support and the inked coating as well as the reproduction characteristics of self-regenerative carbographic articles, characterized in that it essentially comprises a film-forming polymer selected from the group consisting of polyvinylidene chloride, chlorinated rubber and acrylic polymers, from about 30 to 50% by weight sperm oil based on the weight of the film-forming polymer, colouring pigments and plasticizers.

* * * * *